United States Patent [19]

Caballero et al.

[11] 4,401,638

[45] Aug. 30, 1983

[54] PROCESS FOR PURIFYING SILICA SAND

[75] Inventors: Alejandro J. Caballero; Ricardo I. Holcombe, both of Monterrey, Mexico

[73] Assignee: Materias Primas, Monterrey, S.A., Monterrey, Mexico

[21] Appl. No.: 333,257

[22] Filed: Dec. 21, 1981

[51] Int. Cl.$^3$ .............................................. C01B 33/12
[52] U.S. Cl. ................................... 423/340; 423/131; 423/132; 423/150; 106/DIG. 8
[58] Field of Search ............... 423/340, 131, 132, 150; 501/31, 146, 147; 106/DIG. 8; 241/DIG. 10

[56] References Cited

U.S. PATENT DOCUMENTS

| | | | |
|---|---|---|---|
| 1,957,579 | 12/1931 | Carew | 423/340 |
| 2,409,665 | 10/1946 | Cole et al. | 423/340 |
| 2,423,022 | 4/1944 | Herkenhoff | 423/340 |
| 2,769,540 | 11/1956 | Brown | 423/340 |
| 3,503,705 | 3/1970 | Tackett | 423/131 |

OTHER PUBLICATIONS

Dasher, John et al., "New Methods of Purifying Glass Sands" The Bulletin of the American Ceramic Society, vol. 20, No. 6, Jun. 1941, pp. 187-195.
Messner, William E., "Scrubbing Solves Sand Floatation Problem" Mining Engineering, vol. 7, No. 2, pp. 138-139, Feb. 1955.

*Primary Examiner*—O. R. Vertiz
*Assistant Examiner*—Jackson Leeds
*Attorney, Agent, or Firm*—Darby & Darby

[57] ABSTRACT

A process of purifying silica sand comprises grinding sandstone, washing and desliming the ground sandstone to remove the major part of the clay-type binder, attrition-scrubbing the deslimed sand particles to release further amounts of binder therefrom, washing and desliming to remove said binder, drying and heating the sand particles, treating the hot sand with sulfuric acid to convert the iron oxides, ferrosilicates and ferro-aluminous impurities into water soluble compounds, attrition-scrubbing the hot suspension of the chemically treated sand to release the strongly adhering stains of said impurities, washing with cold water and desliming, conditioning the sand suspension with fatty acids or petroleum sulfonate collectors, a polyalcohol frothing agent and, if necessary, a mineral acid to bring the pH to from 1.5 to 7.0, carrying out a first froth-flotation to remove the remaining ferrosilicates and iron oxides, and carrying out a second froth-flotation with a fatty amine collector in the presence of sulfuric acid and/or hydrofluoric acid to activate the aluminosilicates and to remove the same at a pH of from 1.5 to 3.5.

8 Claims, 1 Drawing Figure

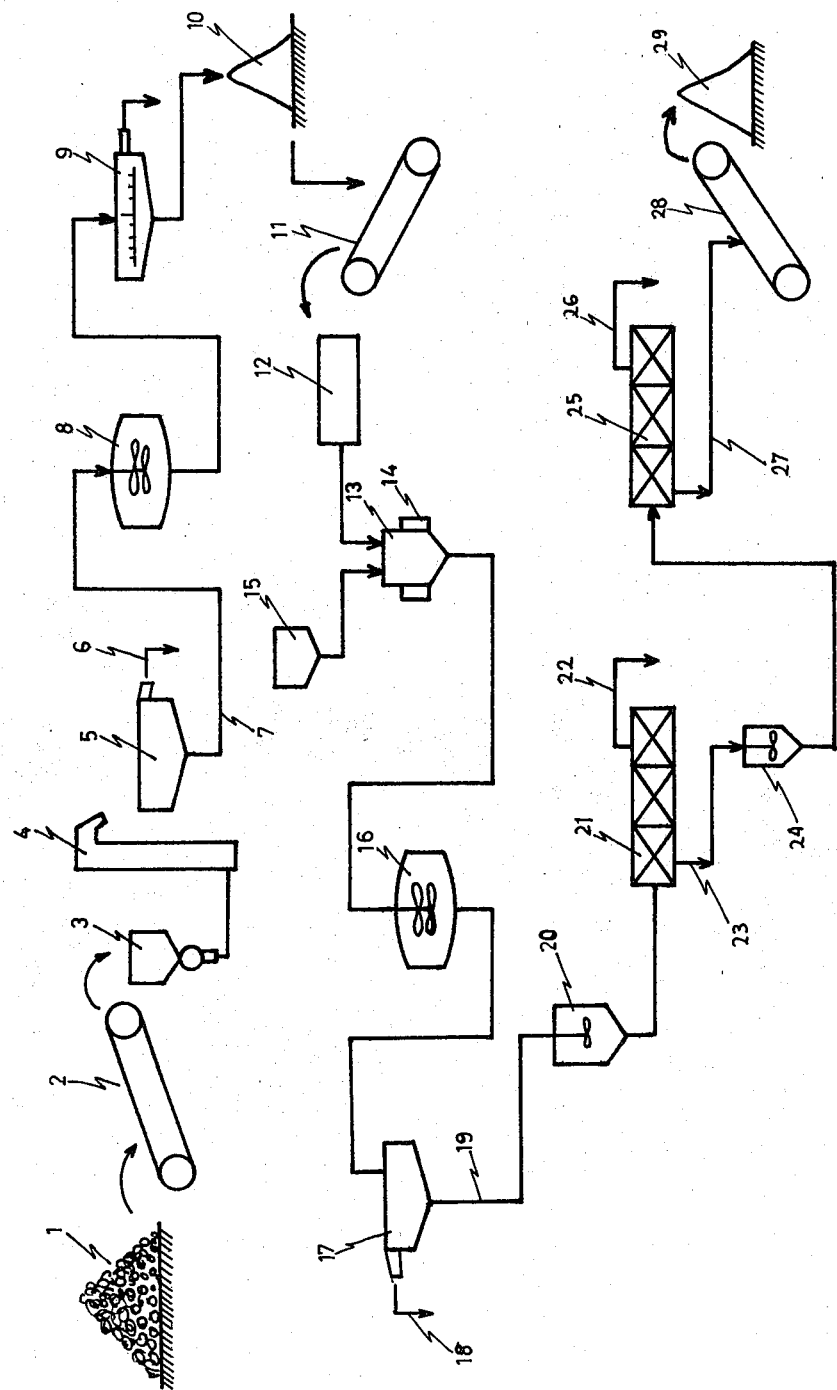

PROCESS FOR PURIFYING SILICA SAND

FIELD OF THE INVENTION

The present invention refers to a process of purifying silica sand and, more particularly, it is related to a process for removing, from silica sands which are to be used as a raw material for glass manufacture, ceramics and the like, practically all of the iron and aluminum impurities contained therein.

BACKGROUND OF THE INVENTION

It is a well known fact that when silica sand is to be used for further processing by smelting thereof, for instance, for the manufacture of glass or ceramics, it is indispensible to remove, from the sandstone from which said sands are obtained, all the iron impurities which contaminate the finished produced by imparting colors which are not admissible, and also all the aluminum impurities, because the aluminum compounds extant in the sandstone from which said sands are obtained are extremely high temperature melting compounds and thus impart to the sands also a high temperature melting characteristic, which is absolutely unsuitable for further processing thereof.

Processes for the removal of iron impurities have been known for long, and most of them rely on the basic old principle of converting the iron insoluble impurities contained by the sandstone, into water soluble compounds, in order to render their removal from the sand easier by washing and scrubbing and the like. In other words, it is a well known fact that all the industrial processes used nowadays for removing iron impurities from ores and particularly for removing iron impurities from silica sand, particularly when silica sand is to be used for glass manufacture, derive from a very well known and old concept which comprises transforming the iron oxide and other iron insoluble impurities, into soluble iron salts, and that this solubilization of the iron impurities has always been effected by treatment with a chemical agent, sulfuric acid being the preferred chemical agent in the so called SAT (Sulfuric Acid Treatment), which is widely used in all the modern installations for treating silica sand to be used for the manufacture of glass.

Thus, for example, Knowles et al., in U.S. Pat. No. 2,306,021, describe the said principle for the first time, in their application dated 1940, and describe a process for removing iron oxide from natural silicon dioxide sand, which includes converting the iron oxide into a soluble iron salt by the action of an acid solution containing sulfuric acid and sodium chloride.

One other achievement in the art is the process described and claimed by Adams et al. in U.S. Pat. No. 2,891,844, wherein the purification of silica sands is accomplished by the reduction of the surface iron oxide content (which stains the silica sand particles and is difficultly releasable therefrom), which reduction is achieved only in up to about 15% of the total iron oxide content, and comprises subjecting the sand to treatment with a hot aqueous solution containing sulfuric acid and a soluble inorganic chloride, said process being carried out in the presence of metallic copper having a large surface area so as to give an ample metallic surface contact for the sand and the solution during the purification treatment.

In turn, Slade et al., in U.S. Pat. No. 3,914,385, describe a process for purifying contaminated sand, which comprises firstly removing by froth flotation a plurality of contaminants such as the kaolin clays and siderite, then treating the resulting partially purified sand with sulfuric acid for a time and at a temperature sufficient to reduce the iron oxide content thereof, and finally filtering the aqueous sulfuric acid leach liquid from the sand and drying the sand.

These processes, however, have proven to be absolutely uncapable of removing the strongly adhered stains of iron impurities in certain mineral ores, particularly in certain types of sand, whereby it has been materially impossible to obtain sufficiently pure minerals to be used for certain purposes, and thus this type of processes have been used only to partially purify said minerals, without accomplishing a purification sufficiently high for certain special uses of said ores.

In an attempt to solve the above mentioned problem, other workers have proposed certain processes which supposedly increase the degree of purification of the ores from iron impurities, and thus, Sturgeon et al. in U.S. Pat. No. 2,592,973, suggest a process for reducing iron impurities in minerals which consists in treating the minerals with an aqueous solution which is free from fluorine ions and oxalic acid but in which the dissolved constituents consist essentially of metallic salts, one of which is selected from titanous sulphate and titanous chloride and one other is selected from sodium sulphate and sodium chloride, and recovering the purified mineral product.

To the knowledge of applicant, this process never resulted in a complete purification of the mineral ores and, on the other hand, the user of titanium salts renders this process absolutely uneconomical, particularly for purifying sand which is a low economical density product, that is, has a relatively low price, and for which titanium compounds are not justifiable. Therefore, this process has been disregarded for any commercial exploitation, in view of its relatively high cost and poor economical results.

One other suggested process is the process of Gross, described in U.S. Pat. No. 2,952,516, which discloses removing iron from silica sand by the steps of adding hydrochloric acid and fluosilicic acid as such to said sand to form an aqueous slurry, separating the sand from the liquid and subsequently washing the sand with water until substantially free of acid. This process, while removing efficiently the iron stains, has the disadvantage that the combination of hydrochloric and fluosilicic acids dissolves to a great extent the silica particles and, therefore, the loss of wanted mineral with the unwanted impurities is so great that this process must also be regarded as absolutely uneconomical and of not practical use whatsoever.

Chubb, in U.S. Pat. No. 3,297,402, in turn, discloses a method of decreasing the quantity of iron sulfide contaminants in silica sand, which comprises the step of leaching the sand with a hypochlorite, but this process is restricted only to remove iron sulfides and not iron oxide, and it is a well known fact that the main contaminant of mineral ores and particularly of silica sand, are iron oxides. Therefore, this process must be discarded as an efficient process for purifying sand, particularly when the latter is to be used for the manufacture of glass.

One other process is described by Segrove in U.S. Pat. No. 3,050,364, and comprises contacting the sand, particularly when the latter is to be used for glass making, at a temperature below 250° C. and in the dry state, with substantially dry gaseous hydrogen chloride until change in color of the sand grains substantially ceases, which indicates that the reaction is substantially complete between the hydrogen chloride and the iron impurities, and then the sand is washed with water to remove the solubilized impurities. While this process might be regarded as an efficient process for removing iron stains from particles of silica sand, it is also highly inconvenient, mainly in view of the following facts: firstly, the dry hydrogen chloride tends to react with the silica particles and therefore partially dissolves the same when the sand is washed with water and, secondly and more important, it requires of very complex installations which must be made of a gas-proof material and must be capable of handling gaseous hydrogen chloride in the dry state, and no doubt this fact complicates the erection of a plant and increases the cost of the process so greatly, that the same may not be regarded as a practical method for purifying mineral ores and particularly sand for glass making purposes.

Finally, Bowdish, in U.S. Pat. No. 4,042,671, purposes and describes a special leaching method for purifying sand and other particulate materials, which comprises leaching iron and other metallic compounds from sand by a series of aqueous solutions of differing compositions, differing in concentrations of leaching component in the form of an acid, and in which the aqueous solutions are fed to the top of the mass of the sand and are permitted to drain through gravitationally with appropriate periods of time between solutions for reaction, said solutions of differing compositions forming series which begin with solutions low in concentration of the leaching component and continue with solutions of higher concentration thereof until the solution of highest strength has been reached by about midway, and then reversing the order by reducing the concentration of the solutions until water is reached. This method is extremely complicate to be controlled adequately and has not proven to give any better results that the common process used presently in all the practical commercial installations for purifying sands, whereby said process has not gained sufficient popularity in view of its uneconomical characteristics.

The modern industrial plants for purifying silica sand, have acquired a technology derived from the accomplishments of the above workers, inter alia, and have developed the very well known process of purifying silica sand which essentially comprises grinding the sand or ore, washing and desliming the ground ore to remove the major part of the clay-type binder, attrition-scrubbing the deslimed particles to release further amounts of binder therefrom, washing and desliming to remove said binder, then treating the particles in suspension with sulfuric acid in order to convert the iron impurities into water soluble iron compounds, and finally washing and desliming with water the chemically treated particles in order to remove as much as possible of the iron impurities from the ore. However, while this process has proven to be the best of all the above described processes, it still has the enormous disadvantage that it is absolutely unable to remove and release from the ore particles (particularly sand) the iron impurities which are in the form of strongly adhered stains on each individual particle, and therefore the sand or other ore obtained by this process, cannot be regarded as a highly purified ore, because said strongly adhered stains of impurities resist the chemical treatment and are not released from the individual particles by said chemical treatment followed by the washing and desliming operations.

As to the removal of aluminum impurities from sandstone, as is also well known, the processes for carrying out said removal are based on froth flotation using a fatty acid amine collector, such as clearly described by Coke, U.S. Pat. No. 3,282,416, patented Nov. 1, 1966, in which Coke describes a process for treating quartz sands which, inter alia, comprises removing clay-like foreign matter from impure quartz sands by washing and decantation with water to produce a sand slurry, adjusting the pH of the slurry to a point away from neutrality but not below a pH of 2.5 nor above pH 11, then adding a fatty amine having alkyl groups containing between 8 and 22 carbon atoms, and subjecting the slurry to flotation to float off a fraction containing refractory aluminous material of the anauxite-type and to produce a residual sand containing not more than about 0.2% of refractory alumina.

While the process described by Coke is highly efficient to remove aluminous substances from silica sand, it relies on the selectivity of the fatty amine collector for the aluminous materials, which selectivity is destroyed completely when the sand particles are coated with even light stains of ferro-aluminous impurities, inasmuch as the fatty amine collector "confuses" the thusly coated silica sand particles with the particles of the silico-aluminates and other aluminum compounds, and tends to float the same together with the silico-aluminates, thereby producing an extremely high loss of silica sand in the froth removed from the flotation process and containing the silico-aluminates. In other words, Coke apparently describes a process which is only useful for silica sands not containing any appreciable amount of ferro-aluminous impurities in the form of stains strongly adhered on the surface of the sand particles, because said process is not useful and does not operate when the sand particles contain ferro-aluminous stains.

All the prior art processes described above for removing iron impurities from silica sand, are not suitable for removing the strongly adhered stains that generally cover an important portion of the surface of the sand particles, and of course none of said processes is capable of removing staining impurities containing ferro-aluminous compounds. As the majority of the silica sandstones extant in the world contain appreciable mounts of ferro-aluminous impurities which generally remain as strongly adhered stains on the surface of the silica grains, the process of Coke is absolutely inadequate for the treatment of such sand particles, because said silica particles would be carried away by the flotation froth together with the silico-aluminates that the flotation process is intended to remove from the silica particles, thus rendering said process absolutely useless.

BRIEF SUMMARY OF THE INVENTION

Having in mind the defects of the prior art processes for purifying silica sand, it is an object of the present invention to provide a process of purifying silica sand which will be capable of efficiently removing the iron and aluminum impurities thereof.

It is another object of the present invention to provide a process in accordance with the above, which will be capable of removing the stains of iron impurities strongly adhered to the sand particles and will render the sand particles suitable to be efficiently treated by means of an amine flotation process.

It is a further and more particular object of the present invention to provide a process of the above mentioned character, which by removing to a great extent the stains of ferro-aluminous contaminations from the surfaces of the silica sand particles, will prevent "confusion" of the amine collectors in the amine froth flotation processes for removing aluminum impurities from sand.

One other object of the present invention is to provide a process of the above mentioned character, which will be of easy execution and yet of high efficiency in removing the iron and aluminum impurities from sand, rendering said sand suitable to be used for glass or ceramics manufacture.

One other object of the present invention is to provide a process of the above mentioned character, which will require a minimum of modifications of existing plants for purifying silica sand.

A more particular object of the present invention is to provide a process of the above mentioned character, which will be capable of efficiently removing from the sand, by amine flotation processes, the aluminum impurities derived from ferro-aluminous stains adhered to the sand particles.

The foregoing objects and other ancillary thereto are preferably accomplished as follows:

According to a preferred embodiment of the present invention, it is proposed to purity silica sand by means of the sequence of steps which comprises grinding sandstone, washing and desliming the ground sandstone to remove the major part of the clay-type binder, attrition-scrubbing the deslimed sand particles to release further amounts of binder therefrom, washing and desliming to remove said binder, drying and heating the sand particles, treating the hot sand with sulfuric acid to convert the iron oxides, ferro-silicates and ferro-aluminous impurities into water soluble compounds, attrition-scrubbing the hot suspension of the chemically treated sand to release the strongly adhering stains of said impurities, washing with cold water and desliming, conditioning the sand suspension with fatty acids or petroleum sulfonate collectors, a polyalcohol frothing agent and, if necessary, a mineral acid to bring the pH to from 1.5 to 7.0, carrying out a first froth-flotation to remove the remaining ferrosilicates and iron oxides, and carrying out a second froth-flotation with a fatty amine collector in the presence of sulfuric acid and/or hydrofluoric acid to activate the aluminosilicates and to remove the same at a pH of from 1.5 to 3.5.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of a specific embodiment when read in connection with the accompanying drawing, in which:

The single FIGURE is a flow sheet illustrating the steps followed in the process of the present invention, for purifying sand from the iron and aluminum impurities contaminating the same.

DETAILED DESCRIPTION

While in the accompanying drawing and in the detailed description that follows, the process of the present invention will be described and illustrated as applied to the purification of silica sand from the staining iron and aluminum impurities contained thereby, it will be clearly apparent to anyone skilled in the art that the present process is not restricted to such purification of silica sand but that, instead, said process may be applicable to the purification of any other type of mineral ore, containing impurities which stain the particles thereof, and therefore it is to be understood that it is not desired to restrict this invention to said illustrative embodiment which will be described hereinbelow.

Having now more particular reference to the drawing, there is shown a process according to the present invention, for the purification of silica sand from the iron and aluminum impurities that stain the individual particles thereof, and which comprises feeding the sandstone as extracted from the place of beneficiation, illustrated by means of the pile 1, by means of any suitable conveyor 2, into a grinder or crusher 3, in order to uniformly reduce the particle size of the mineral ore, such that the further treatment be effected with more efficiency. From the grinder 3, the ground ore is passed by means of any suitable elevator or conveyor 4, into the washer 5, wherein the mineral ore is washed with water in order to form a suspension of clay-binder material which is extracted through line 6, whereas the heavier silica sand particles with the remaining adhered clay-binder, is passed through line 7 in the form of a heavy water suspension, into an attrition-scrubber 8, wherein the sand particles in suspension are forced to be rubbed against each other, in order to release the clay-type binder for further removal thereof. Of course it will be obvious to any one skilled in the art that this combination of steps of washing and attrition-scrubbing, may be repeated several times in accordance with the needs, three of said repeated steps being normally used in plants for purifying silica sand.

The particulate attrition-scrubbed material is fed to the deslimer 9, in order to remove the binder from the sand particles, which are transported to a suitable storage means 10, from which the moist particles are fed by means of a suitable conveyor 11 to a dryer 12, wherein said particles are dried and heated to a temperature of from about 100° to 250° C., preferably of from about 150° to 200° C., to be introduced at this temperature into reactor 13 which has means 14 for maintaining the temperature of the reaction mixture.

In the reactor 13, a chemical treatment solution is fed from tank 15, in order to react with the iron impurities of the sand particles contained in the reactor 13, said chemical agent being capable of converting the insoluble iron impurities, such as iron oxides and silicates, into soluble ferrous salts, in order to enable further removal thereof from the sand particles.

As preferred chemical agents, concentrated sulfuric acid, 35% hydrogen chloride solution or 50% caustic soda solution are generally used, and an amount of from 10 to 70 kg. of said chemical agent per ton of ore and an amount of 20 to 100 kgs. of water per ton of said ore are simultaneously introduced into the reactor 13, in order to chemically treat the sand for a period of time of from 5 to 45 minutes, preferably from 10 to 30 minutes, in order to fully convert said insoluble iron compounds into soluble iron compounds.

After the chemical attack in reactor 13, the hot suspension is poured into the attrition-scrubber 16, wherein the suspension is treated at a 65 to 80% solid content and for a period of time of from about 1 to about 10 minutes, in order to fully release the stains of impurities from the sand particles.

From the attrition-scrubber 16, the suspension is passed to a washer 17 wherein said suspension is washed with cold water. From the washer 17, the iron and ferro-aluminous impurities are extracted in suspension through line 18 and discarded, whereas the silica sand mud is fed, through line 19, into a conditioner tank 20 wherein the slurry is conditioned by the addition of from 0.3 to 1 kg/ton of sand of petroleum sulfonates, and a foaming polyalcohol in an amount of 0.05 to 0.2 kg/ton of sand, as well as, if necessary, a mineral acid to obtain a pH of from 1.5 to 7.0, which treatment is carried out for a period of from about 3 to 10 minutes, to thereafter send the conditioned mixture to the flotation chamber 21 wherein it is subjected to a froth flotation process by aeration and stirring, in order to remove the ferrosilicates and iron oxides, which are extracted from the flotation chamber 21 with the froth through a trough 22, whereas the silica sand which sunk into the flotation chamber is extracted through line 23 and sent to a second conditioner tank 24, for the addition of fatty amines (preferably a mixture of primary and secondary amines) in a proportion of 0.1 to 0.5 kg/ton of sand, as well as hydrofluoric acid and sulfuric acid in an amount sufficient to activate the aluminosilicates and to obtain a pH of from 1.5 to 3.5, which conditioning takes from about 0.5 to about 1.5 minutes, and thereafter the conditioned mixture is sent to a second flotation chamber 25 wherein the aluminosilicates are entrained in the froth through trough 26, whereas the sinking purified silica sand is extracted through line 27 and conveyed by means of a suitable conveyor 28 to a suitable storage space 29 for purified silica sand.

The present invention will best be understood in the following examples that are given in an illustrative but not limitative manner.

EXAMPLE 1

A sandstone obtained from the North of Mexico, pertaining to the Carrizo formation, was ground to a size of −60 Tyler mesh, in order to release the silica grains from the clay-type binder and thereafter the ground standstone was subjected to attrition-scrubbing at a solids content of 75% to remove the highest possible amount of released clay. The thus prepared material contained 0.17% of $Fe_2O_3$ and 0.85% of $Al_2O_3$.

The above material was subjected to treatment with sulfuric acid at a rate of 30 kg/ton of material, in accordance with the process described above, followed by an attrition-scrubbing operation during a period of 3 minutes at a 75% solids content, in order to remove the stains of iron and ferro-aluminous impurities from the surface of the sand particles.

The material was thereafter subjected to a neutral flotation process with 0.25 kg/ton of sand of a commercial mixture of oleic and linoleic acids (Hercomin B-01) and 0.100 kg/ton of sand of a foaming agent which is a polyalcohol known as cc-1025. This flotation removes the ferrosilicates and iron oxides contained in the material.

Finally, the material was floated with a fatty amine, using 0.250 kg/ton of sand of the amine known as Kao-Amin, the foaming agent cc-1025 and sufficient hydrofluoric acid to activate the aluminosilicates and to depress the silica.

The product obtained as the amine flotation tails, was a highly purified silica sand containing only 0.024% $Fe_2O_3$ and 0.23% $Al_2O_3$.

EXAMPLE 2

The process described in Example 1 was repeated, with the exception that instead of the neutral flotation step, an acid flotation step was used, by adding 1 kg/ton of Sintoquim, a petroleum sulfonate, 2 kg/ton of sulfuric acid and 0.2 kg/ton of the foaming agent cc-1025.

The product obtained as the amine flotation tails was a highly purified silica sand containing only 0.028% $Fe_2O_3$ and 0.27% $Al_2O_3$.

From the above it may be seen that the process of the present invention renders the amine flotation step highly efficient, also when said amine flotation step is used with silica sands containing appreciable amounts of ferro-aluminous impurities, inasmuch as said process removes all the stains from the surface of the silica particles, thus enabling the amine collector to clearly distinguish as from aminosilicates and silica particles, inasmuch as the latter are not contaminated with stains of aluminum containing impurities which are also selected by the amine collector for the flotation process, and entrained in the froth of said flotation process. With the treatment of the sand in accordance with the process of the present invention, said ferro-aluminous stains are removed from the surface of the silica particles and, therefore, said silica particles are easily "recognized" by the amine collector, which therefore exerts its selectivity only toward the aluminosilicate particles to float the same and allow the silica particles to sink in the flotation chamber.

Although a certain specific embodiment of the present invention has been shown and described in the above, it is to be understood that many modifications thereof are possible. The present invention, therefore, is not to be restricted excepto insofar as is necessitated by the prior art and by the spirit of the appended claims.

What is claimed is:
1. A process of purifying silica sand comprising:
   a. grinding sandstone to obtain sand particles;
   b. washing and desliming said particles to remove a major portion of clay-type binder contained in said sandstone;
   c. attrition-scrubbing said deslimed sand particles to release further amounts of said binder from said particles;
   d. further washing and desliming said sand thereby essentially removing said further amounts of said binder;
   e. drying and heating said sand;
   f. treating said hot sand particles with a solution of sulfuric acid to convert at least one of impurities selected from the group consisting of iron oxides, ferro-silicates and ferro-aluminous compounds into water soluble compounds;
   g. attrition-scrubbing the resulting hot suspension of said acid treated sand particles to release strongly adhering stains of said impurities from said particles;
   h. washing said suspension with cold water and desliming;
   i. conditioning said suspension with collectors and frother;
   j. floating and removing at least one of remaining ferrosilicates and iron oxides in a first flotation step conducted at a pH ranging from 1.5 to 7; and k. floating and removing remaining aluminosilicates in a second flotation step using a fatty amine collector in the presence of at least one activator selected from the group consisting of sulfuric acid and hydrofluoric acid.

2. The process of claim 1 further comprising the step of adjusting the pH of said suspension to be in the range of 1.5 to 7.0 by use of a mineral acid prior to said first flotation step.

3. A process according to claim 1 wherein said sand is heated to a temperature of from 100° to 250° C., preferably from 150° to 200° C. before being subjected to said sulfuric acid treatment.

4. A process according to claim 3 wherein said sulfuric acid treatment is carried out for a period of from 5 to 45 minutes in order to completely solubilize the iron oxides, ferrosilicates and ferro-aluminous impurities which stain the surface of the sand particles.

5. A process according to claim 4 wherein the attrition following the sulfuric acid treatment is carried out at a solids content of from 65 to 80% and for a period of time of from 1 to 10 minutes.

6. A process according to claim 1 wherein said first froth flotation is carried out at a pH of from 6 to 7 by using a mixture of oleic and linoleic acids as the collector and a polyalcohol as the foaming agent.

7. A process according to claim 1 wherein said first froth flotation is carried out at a pH of from 1.5 to 3.5 by using a synthetic petroleum sulfonate collector, in the presence of sulfuric acid and a polyalcohol foaming agent.

8. A process according to claim 1 wherein said second froth-flotation is effected at a pH of from 1.5 to 3.5.

* * * * *